US012093634B2

(12) United States Patent
Cao et al.

(10) Patent No.: US 12,093,634 B2
(45) Date of Patent: Sep. 17, 2024

(54) PATH DELAY PREDICTION METHOD FOR INTEGRATED CIRCUIT BASED ON FEATURE SELECTION AND DEEP LEARNING

(71) Applicant: SOUTHEAST UNIVERSITY, Nanjing (CN)

(72) Inventors: Peng Cao, Nanjing (CN); Xu Cheng, Nanjing (CN); Tai Yang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/567,044

(22) PCT Filed: Jan. 3, 2023

(86) PCT No.: PCT/CN2023/070103
§ 371 (c)(1),
(2) Date: Dec. 5, 2023

(87) PCT Pub. No.: WO2024/011877
PCT Pub. Date: Jan. 18, 2024

(65) Prior Publication Data
US 2024/0265190 A1 Aug. 8, 2024

(30) Foreign Application Priority Data
Jul. 14, 2022 (CN) .......................... 202210832374.4

(51) Int. Cl.
*G06F 30/398* (2020.01)
*G06F 30/27* (2020.01)
(Continued)

(52) U.S. Cl.
CPC ............ *G06F 30/398* (2020.01); *G06F 30/27* (2020.01); *G06F 30/33* (2020.01);
(Continued)

(58) Field of Classification Search
CPC ..................................................... G06F 30/398
(Continued)

(56) References Cited
U.S. PATENT DOCUMENTS
10,915,685 B1    2/2021 Gupta et al.
2023/0034736 A1* 2/2023 Singh ................... G06F 30/3315

FOREIGN PATENT DOCUMENTS
CN        109255159 A    1/2019
CN        113326656 A    8/2021
(Continued)

OTHER PUBLICATIONS

Peng Cao, et al., TF-Predictor: Transformer-Based Prerouting Path Delay Prediction Framework, IEEE Transactions on Computer-Aided Design of Integrated Circuits and Systems, 2003, pp. 2227-2237, vol. 42, No. 7.
(Continued)

*Primary Examiner* — Eric D Lee
(74) *Attorney, Agent, or Firm* — Bayramoglu Law Offices LLC

(57) ABSTRACT

A path delay prediction method for an integrated circuit based on feature selection and deep learning. First, an integrated feature selection method based on filter methods and wrapper methods is established to determine an optimal feature subset. Timing information and physical topological information of a circuit are then extracted to be used as input features of a model, and local physical and timing expressions of cells in circuit paths are captured by means of the convolution calculation mechanism of a convolutional neural network. In addition, a residual network is used to calibrate a path delay. Compared with traditional back-end design processes, the path delay prediction method provided by the invention has remarkable advantages in prediction
(Continued)

accuracy and efficiency and has great significance in accelerating the integrated circuit design process.

8 Claims, 1 Drawing Sheet

(51) Int. Cl.
    *G06F 30/33*     (2020.01)
    *G06F 30/3312*     (2020.01)
    *G06F 30/3315*     (2020.01)
    *G06F 30/392*     (2020.01)
    *G06F 30/3953*     (2020.01)

(52) U.S. Cl.
    CPC ...... *G06F 30/3312* (2020.01); *G06F 30/3315* (2020.01); *G06F 30/392* (2020.01); *G06F 30/3953* (2020.01)

(58) Field of Classification Search
    USPC .......................................................... 716/113
    See application file for complete search history.

(56) References Cited

FOREIGN PATENT DOCUMENTS

| CN | 114117943 A | 3/2022 |
|----|-------------|--------|
| CN | 115146580 A | 10/2022 |

OTHER PUBLICATIONS

Jingjing Guo, et al., Novel Prediction Framework for Path Delay Variation Based on Learning Method, Electronics, 2020, pp. 1-11, vol. 9, No. 157.

Peng Cao, et al., An Accurate and Efficient Timing Prediction Framework for Wide Supply Voltage Design Based on Learning Method, Electronics, 2020, pp. 1-13, vol. 9, No. 580.

* cited by examiner

PATH DELAY PREDICTION METHOD FOR INTEGRATED CIRCUIT BASED ON FEATURE SELECTION AND DEEP LEARNING

CROSS REFERENCE TO RELATED APPLICATIONS

This application is a national stage entry of International Application No. PCT/CN2023/070103, filed on Jan. 3, 2023, which is based upon and claims foreign priority to Chinese Patent Application No. 202210832374.4, filed on Jul. 14, 2022, the entire contents of which are incorporated herein by reference.

TECHNICAL FIELD

The invention relates to a method for predicting the path delay of an integrated circuit, in particular to a path delay prediction method for an integrated circuit based on feature selection and deep learning.

BACKGROUND

With the constant development of integrated circuits and continuous improvement of process nodes, cost, quality and predictability become three interactive challenges in integrated circuit design. Cost refers to the project workload, calculation and design cycle. Quality refers to traditional evaluation indicators including power consumption, performance, area, reliability, yield and the like. Predictability refers to the reliability of the design progress, for example, whether an unpredictable amendment of the floor planning will occur or whether there will be a timing closure cycle exceeding the planned time. With the increase of the design and fabrication complexity and the integration level of chips, static timing analysis has become indispensable for verifying the timing accuracy of chips and evaluating whether chips can operate normally at an expected frequency in all stages of integrated circuit design. The unpredictability of timing closure and the demand for minimum pessimistic design lead to inevitable time-consuming and labor-consuming design iterations. In this case, the study for reducing the unpredictability of timing closure will be of great significance.

Frequent interaction for static timing analysis is necessary in all the stages of integrated circuit design. With the constant development of technology and the continuous evolution of the process nodes, the problem of inconsistency in timing analysis of different stages becomes increasingly serious. Inaccurate timing estimation of the downstream design stage will lead to design iterations, affecting the design progress and causing the consumption of computing resource and a waste of cost. For example, it is difficult to evaluate the timing inconsistency between one stage and the next stage a back-end process. In an actual digital circuit design process, an excessively pessimistic timing design and multiple iterations are often used to reduce the influence of timing inconsistency. However, these schemes are not accurate enough or take a long time in computation. A timing analysis method which can efficiently and accuracy predict, in the current stage, the timing in a later stage is urgently needed.

SUMMARY

Objective of the invention: The objective of the invention is to provide a path delay prediction method for an integrated circuit based on feature selection and deep learning, which can accurately and efficiently predict, in one stage of back-end design of a circuit, the path delay of the circuit in a subsequent stage.

Technical solution: To fulfill the above objective, the invention adopts the following technical solution:

The invention provides a path delay prediction method for an integrated circuit based on feature selection and deep learning, wherein the feature selection refers to an integrated feature selection method, and the deep learning refers to a convolutional neural network; and circuit paths of the integrated circuit comprise at least two levels of combinational logics. The method comprises the following steps:

S1: performing physical implementation on a synthesized circuit netlist, which comprises a floor-planning stage, a placement stage, a clock tree synthesis stage and a routing stage according to an implementation process, wherein floor-planning is graphical representation of main functional modules of a circuit in an experimental layout; placement is a physical design process of placing cells and modules of a circuit on a chip with a specified area; clock tree synthesis is to define desired parameters, including clock definition, input delay, output delay and the like, by means of a clock tree constraint file; routing is to connect the cells and modules placed in designated positions after placement;

S2: extracting information in stage 1 and stage 2 of the physical implementation in S1, and performing training and predicting a circuit path delay in stage 2 according to the information extracted in stage 1, wherein in the physical implementation process, stage 1 is previous to stage 2; in stage 1, timing and physical topological information of each stage of cell in each path is extracted from a static timing report and a network report to be used as features, and a feature universal set $F=\{F_1, F_2, \ldots, F_d\}$ is formed by d features; and in stage 2, cell delays and path delays are extracted from the static timing report to be used as labels of the feature selection and the convolutional neural network respectively;

S3: combining filter methods and wrapper methods to form the integrated feature selection method, wherein the filter methods comprise a Pearson's correlation coefficient method and a variation coefficient method, and the wrapper methods comprise a backward recursive feature elimination method based on a random forest model and a backward recursive feature elimination method based on a linear regression model; and inputting the feature universal set F and the cell delay labels obtained in S2 to the integrated feature selection method, and based on the majority rule, determining an optimal feature sub-set by voting according to results of the four feature selection methods;

S4: establishing a path delay prediction model, using a path feature sequence formed by features corresponding to the optimal feature sub-set determined in S3 is as an input of the one-dimensional convolutional neural network, merging a path delay of stage 1 passing through a fully connected layer and an output by the convolutional neural network, performing dimension reduction to obtain a predicted path delay residual of stage 1 and stage 2, and then adding the predicted path delay residual and the path delay of stage 1 to obtain a path delay of stage 2 estimated by the model; and S5: randomly classifying all data into a training set and a test set, calculating, by the integrated feature selection method established in S3, the importance of the features using data in the training set, and obtaining an optimal feature sub-set; and training the model established in S4 using the data in the training set, and verifying the accuracy and efficiency on the trained model using data in the test set.

Preferably, S2 specifically comprises the following steps:

S21: respectively performing static timing analysis on the circuit netlist in stage 1 and stage 2 respectively, wherein stage 1 is the floor-planning stage, the placement stage, the clock tree synthesis stage or the routing stage, stage 2 is the floor-planning stage, the placement stage, the clock tree synthesis stage or the routing stage, and stage 1 is previous to stage 2; using the timing and physical topological information of each stage of cell in each path extracted from the static timing report and the network report in stage 1 as features, and forming the feature universal set $F=\{F_1, F_2 \ldots, F_d\}$ by d features; forming a feature matrix X with a dimension of n×d by features of all cells, wherein n represents the number of cells in the circuit, the row of the matrix is a row vector formed by all features of one cell, and the column of the matrix is a feature column vector formed by values of one feature of all the cells; using corresponding cell delays and circuit path delays extracted from the static timing report in stage 2 as the labels of the feature selection and the convolutional neural network respectively, forming a label vector Y by all cell delay labels, and forming a label vector Y' by all path delay labels, timing features of a cell comprise an input transition time, an output transition time, an input signal polarity, an output signal polarity and a delay of the cell; and physical topological features of a cell comprise the capacitance of an input pin of the current cell, the capacitance of an input pin of the next stage of cell, a total output capacitance of the current cell, horizontal and vertical coordinates of the input pin of the current cell, a Manhattan distance between the input pin of the current cell and the input pin of the next stage of cell, a Manhattan distance between an output pin of the current cell and an output pin of the next stage of cell, the type of the current cell, the type of the next stage of cell, and the number of fan-outs of the output pin of the current cell; and S22: then, combining the features of the cells obtained in S21 into path feature sequences according to a connection relation of the cells in the circuit path, and inputting path timing feature sequences and path physical topological feature sequences to the convolutional neural network, wherein the path timing feature sequences comprise a sequence formed by the input transition time of all stages of cells in the path, a sequence formed by the output transition time of all the stages of cells, a sequence formed by the input signal polarity of all the stages of cells, a sequence formed by the output signal polarity of all the stages of cells, and a sequence formed by the delays of all the stages of cells, and the path physical topological feature sequences comprise a sequence formed by the capacitance of the input pins of all the stages of cells in the path, a feature sequence formed by the capacitance of the output pin of each next stage of cell, a feature sequence formed by the current total output capacitance of all the stages of cells, a feature sequence formed by the horizontal and vertical coordinates of the input pins of all the stages of cells, a feature sequence formed by the Manhattan distance between the input pin of each stage of cell and the input pin of the next stage of cell, a sequence formed by the Manhattan distance between the output pin of each stage of cell and the output pin of the next stage of cell, a feature sequence formed by the type of all the stages of cells, a feature sequence formed by the type of each next stage of cell, and a feature sequence formed by the number of fan-outs of the output pin of all the stages of cells; setting a maximum length of a training path as max_len, filling feature sequences with a length less than max_len, and truncating feature sequences with a length greater than max_len.

Preferably, S3 specifically comprises the following steps:

S31: during feature selection based on the filter methods, calculating a distance correlation coefficient between each feature and the corresponding label obtained in S3 and a normalized variation coefficient of each cell feature through a distance correlation coefficient method and a variation coefficient method respectively, wherein the distance correlation coefficient method evaluates the importance of features by calculating the distance correlation coefficient; a threshold of the distance correlation coefficient is set as $R_t$, and features with the distance correlation coefficient with the corresponding labels being greater than $R_t$ form a feature sub-set selected by the distance correlation coefficient method, wherein the distance correlation coefficient is calculated as follows: based on the n×d feature matrix and the label vector Y obtained in S21, an intermediate variable $A_{kl}$ is calculated by formula (1), where the row vector of X is $X_1, X_2, \ldots$ and $X_n$, $X_k$ and $X_l$ represent the row vector formed by features of a $k^{th}$ cell and the row vector formed by features of a $l^{th}$ cell, k=1, 2, \ldots, n, l=1, 2, \ldots, n, n represents the number of all the cells, d represents the number of all the features; $a_{kl}$ represents a Euclidean norm between $X_k$ and $X_l$; $\bar{a}_k$ represents a mean value of the sum of l calculated by $a_{kl}$; $\bar{a}_l$ represents a mean value of the sum of k calculated by $a_{kl}$; $\bar{a}*$ is a mean value of the sum of any one of l and k calculated by $a_{kl}$; $A_{kl}$ is the intermediate variable;

$$\begin{cases} a_{kl} = |X_k - X_l|_d \\ \bar{a}_k = \frac{1}{n}\sum_{l=1}^{n} a_{kl} \\ \bar{a}_l = \frac{1}{n}\sum_{k=1}^{n} a_{kl} \\ \bar{a}_* = \frac{1}{n^2}\sum_{k,l=1}^{n} a_{kl} \\ A_{kl} = a_{kl} - \bar{a}_k - \bar{a}_l + \bar{a}_* \end{cases} \quad (1)$$

similarly, an intermediate variable $B_{kl}$ is calculated by formula (2), where $Y_k$ and $Y_l$ represent the labels of the $k^{th}$ cell and the $l^{th}$ cell, k=1, 2, \ldots, n, l=1, 2, \ldots and n, n represents the number of all the cells, and d represents the number of all the features; $b_{kl}$ represents a Euclidean norm between $Y_k$ and $Y_l$; $\bar{b}_k$ represents a mean value of the sum of l calculated by $b_{kl}$; $\bar{b}_l$ represents a mean value of the sum of k calculated by $b_{kl}$; $\bar{b}*$ is a mean value of the sum of any one of l and k calculated by $b_k$; $B_{kl}$ is the intermediate variable;

$$\begin{cases} b_{kl} = |Y_k - Y_l| \\ \overline{b_k} = \frac{1}{n}\sum_{l=1}^{n} b_{kl} \\ \overline{b_l} = \frac{1}{n}\sum_{k=1}^{n} b_{kl} \\ \overline{b_*} = \frac{1}{n^2}\sum_{k,l=1}^{n} b_{kl} \\ B_{kl} = b_{kl} - \overline{b_k} - \overline{b_l} + \overline{b_*} \end{cases} \quad (2)$$

a covariance of X and Y, a covariance $V_n^2(X)$ of X and itself and a covariance $V_n^2(Y)$ of Y and itself are calculated by formula (3);

$$\begin{cases} v_n^2(X, Y) = \frac{1}{n^2}\sum_{k,l=1}^{n} A_{kl} B_{kl} \\ v_n^2(X) = \frac{1}{n^2}\sum_{k,l=1}^{n} A_{kl}^2 \\ v_n^2(Y) = \frac{1}{n^2}\sum_{k,l=1}^{n} B_{kl}^2 \end{cases} \quad (3)$$

a distance correlation coefficient $R_n^2(X,Y)$ between the feature matrix X and the label vector Y is calculated by formula (4);

$$R_n^2(X, Y) = \begin{cases} \frac{v_n^2(X, Y)}{\sqrt{v_n^2(X)v_n^2(Y)}}, & v_n^2(X)v_n^2(Y) > 0 \\ 0 & v_n^2(X)v_n^2(Y) = 0 \end{cases} \quad (4)$$

the variation coefficient method evaluates the importance of features by calculating the normalized variation coefficient; the threshold of the normalized variation coefficient is set as $CV_t$, and features with the normalized variation coefficient exceeding $CV_t$ form a feature sub-set selected out by the variation coefficient method. The normalized variation coefficient $CV_t$ of one feature is calculated by formula (5), wherein $X_i$ represents the column vector of an $i^{th}$ feature, i=1, 2, . . . , d, d is the number of all features, std( ) represents a standard deviation, and mean( ) represents a mean value;

$$CV(X_i) = \frac{std(X_i)}{mean(X_i)} / \sum_{i=1}^{d} \frac{std(X_i)}{mean(X_i)} \quad (5)$$

S32: selecting the backward recursive feature elimination method based on the random forest model and the backward recursive feature elimination method based on the linear regression model as the wrapper methods depending on model selection, and setting the number of features in a target feature sub-set as m(1≤m≤d);

S321: using the feature matrix X of stage 1 obtained in S2 and the label vector Y formed by cell delays in stage 2 as input features and labels of the random forest model; in the backward recursive feature elimination process, from the feature universal set F, figuring out the importance of each feature in the model by calculating a Gini index of said feature using the trained random forest model, and then deleting the least important feature to obtain a new feature sub-set $F_{new}$;

S322: next, retraining the model based on the new feature sub-set $F_{new}$ obtained in S321 and obtaining the importance of the features again to generate a new feature sub-set, repeating the iteration process until the number of features in the new feature sub-set is m, and using the feature sub-set formed by the m features as a target feature sub-set selected by the backward recursive feature elimination method based on the random forest model;

S331: using the feature matrix X of stage 1 obtained in S2 and the label vector Y formed by cell delays in stage 2 as input features and labels of the linear regression model, wherein the linear regression model is shown by formula (6), f(X) is an output value of the linear regression model, $X=(x_1, x_2, \ldots x_d)$, X is the feature matrix, $x_l$ represents the column vector formed by the values of the $l^{th}$ feature of all the cells, $w_l$ represents a corresponding coefficient of a feature vector $x_l$ in the model, b is an offset, l=1, 2, . . . , d, and d is the number of all features; in the backward recursive feature elimination process, from the feature universal set F, sorting, by the trained model, the features according to the corresponding coefficients of the features in the linear regression model, and then deleting the feature with a minimal coefficient (the least important feature $F_{min}'$) to obtain a new feature sub-set $F_{new}'$;

$$f(X) = w_1 x_1 + w_2 x_2 + \ldots + w_d x_d + b \quad (6)$$

S332: next, retraining the model based on the new feature sub-set $F_{new}$ obtained in S321, obtaining the importance of the features again to generate a new feature sub-set, repeating the iteration process until the number of features in the new feature sub-set is m, and using the feature sub-set formed by the m features as a target feature sub-set selected by the backward recursive feature elimination method based on the linear regression model; and S34: selecting the feature sub-sets by the distance correlation coefficient method, the variation coefficient method, the backward recursive feature elimination method based on the random forest model and the backward recursive feature elimination method based on the linear regression model, wherein the feature sub-sets selected by the four methods are not completely the same; providing, by the four feature selection methods, selection results of the $i^{th}$ feature $F_i$ respectively, where i=1, 2, . . . and d, and d is the number of all features; if $m_i$ feature selection methods select the feature $F_i$, m=0, 1, 2, 3 and 4, the voting result is $m_i$; finally, based on the majority rule, forming an optimal feature sub-set $F_{opt}$ selected by the integrated feature selection method by all features $F_i$ satisfying $m_i \geq m_0 (1 \leq m_0 \leq 4)$, wherein the number of features in the optimal feature sub-set $F_{opt}$ is $M_{opt}$.

Preferably, the one-dimensional convolutional neural network for path delay prediction is established, and S4 specifically comprises the following steps:

S41: inputting the optimal feature sub-set is $M_{opt}$ selected by feature selection in S3 to the one-dimensional convolutional neural network, S42: encoding each feature by an input embedding layer; transforming each input feature sequence in an input sequence obtained in S22 into a vector with a dimensional of $dim_j$ by a special trainable embedding layer, that is, transforming the input feature sequence with a dimension of (p,max_len) into a tensor with a dimension of (p,max_len,dim$_j$), wherein samples is the number of paths in the circuit, max_len is a maximum path length, dim$_j$ is a designated word vector dimension of a j$^{th}$ feature in the embedding layer, j=1, 2, . . . , M$_{opt}$, and M$_{opt}$ is the number of input features; concatenating M$_{opt}$ tensors to obtain a tensor with a dimension of (p,max_len,dim), which is used as an input tensor T, where dim, as shown by formula (7), is the sum of dimensions of the M$_{opt}$ tensors; and $$dim = \sum_{j=1}^{M_{best}} dim_j \quad (7)$$

S43: performing convolution calculation on T with multiple convolution kernels of different sizes, and performing data dimension reduction on convolution calculation results by an activation function and max-pooling respectively, splicing dimension-reduced data and the path delay of stage 1 subjected to nonlinear transform, and transforming spliced data into one-dimensional data by multiple times of nonlinear transform, such that the predicted path delay residual of stage 1 and stage 2 is obtained; finally, adding the path delay of stage 1 and the predicted path delay residual of stage 1 and stage 2 to obtain a predicted path delay of stage 2.

Beneficial effects: the path delay prediction method for an integrated circuit based on feature selection and deep learning disclosed by the invention can predict, in one stage of back-end design of a circuit, the path delay of the circuit in a subsequent stage, and compared with traditional timing analysis processes, has remarkable advantages in accuracy and efficiency, and has great significance in guiding circuit design and optimization and accelerating the integrated circuit design process.

DETAILED DESCRIPTION OF THE EMBODIMENTS

Figure 1:
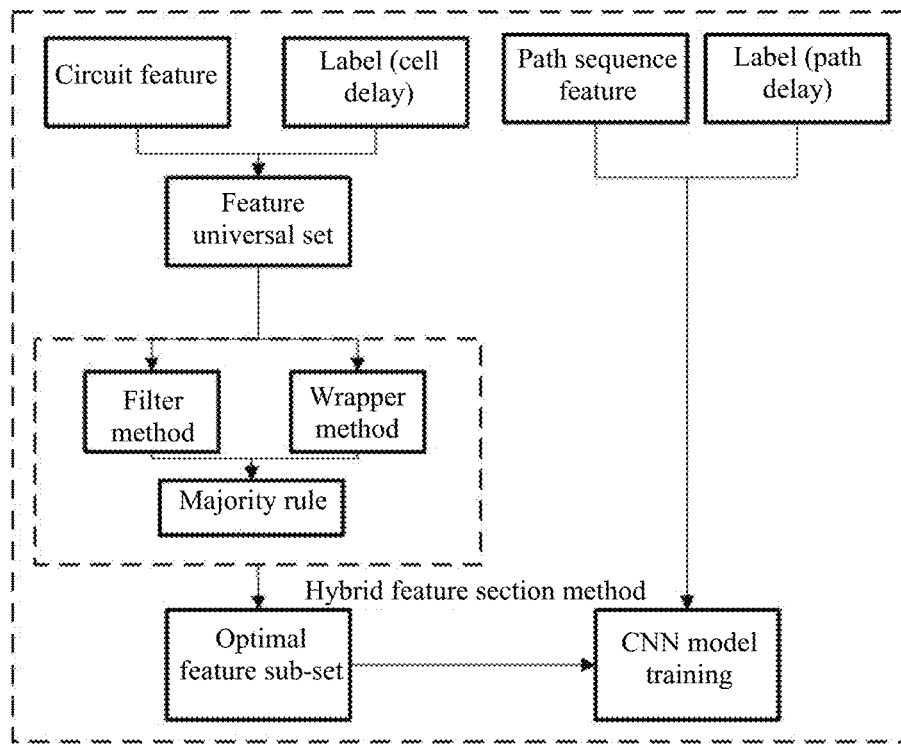
FIG. 1 is a flow diagram of a path delay prediction method for an integrated circuit based on feature selection and deep learning according to one embodiment of the invention.
Figure 2:
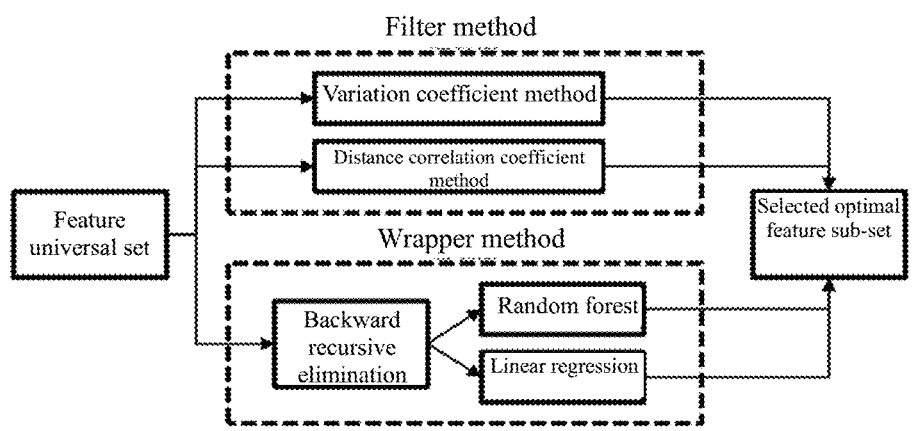
FIG. 2 is a schematic framework diagram of a feature selection scheme.

The technical solution of the invention will be further introduced below in conjunction with specific embodiments.

A specific embodiment of the invention discloses a path delay prediction method for an integrated circuit based on feature selection and deep learning, wherein the feature selection refers to an integrated feature selection method, and the deep learning refers to a convolutional neural network; and circuit paths of the integrated circuit comprise at least two levels of combinational logics, for example, when circuit data is taken into account later, paths without the combinational logics will be deleted during data preprocessing. The path delay prediction method comprises the following steps:

S1: on the basis of a technology library of SMIC40 nm, TT process, 1.1V voltage and 25° C. temperature corner, a circuit netlist is synthesized from nine reference circuits from ISCAS and OpenCoresusingDesign-Compiler from Synopsys. Then, back-end physical implementation is performed on the synthesized circuit netlist using IC Compiler, wherein the back-end physical implementation comprises a floor-planning stage, a placement stage, a clock tree synthesis stage and a routing stage;

S2: static timing analysis is performed on stage 1 and stage 2 of the physical implementation in S1 by means of Prime Time to extract information, and the information extracted in stage 1 is used for training and predicting a circuit path delay in stage 2. In the physical implementation process, stage 1 is previous to stage 2. In stage 1, timing and physical topological information of each stage of cell in each path is extracted from a static timing report and a network report to be used as features, and a feature universal set F={F$_1$, F$_2$, . . . , F$_d$} is formed by d features. In stage 2, cell delays and path delays are extracted from the static timing report to be used as labels of the feature selection and the convolutional neural network respectively.

S21: a text processing script is compiled using python, and static timing analysis is performed on the circuit netlist in stage 1 and stage 2 respectively, wherein stage 1 is the floor-planning stage, the placement stage, the clock tree synthesis stage or the routing stage, stage 2 is the floor-planning stage, the placement stage, the clock tree synthesis stage or the routing stage, and stage 1 is previous to stage 2. In stage 1, the timing and physical topological information of each stage of cell in each path is extracted from the static timing report and the network report to be used as features, and the feature universal set F={F$_1$, F$_2$, . . . , F$_d$} is formed by d features. A feature matrix X with a dimension of n×d matrix is formed by features of all cells, wherein n represents the number of cells in the circuit. The row of the matrix is a row vector formed by all features of one cell, and the column of the matrix is a feature column vector formed by values of one feature of all the cells. In stage 2, corresponding cell delays and circuit path delays are extracted from the static timing report to be used as the labels of the feature selection and the convolutional neural network respectively, all cell delay labels form a label vector Y, and all path delay labels form a label vector Y'. Wherein, timing features of the cell comprise an input transition time, an output transition time, an input signal polarity, an output signal polarity and a delay of the cell. Physical topological features of the cell comprise the capacitance of an input pin of the current cell, the capacitance of an input pin of the next stage of cell, a total output capacitance of the current cell, horizontal and vertical coordinates of the input pin of the current cell, a Manhattan distance between the input pin of the current cell and the input pin of the next stage of cell, a Manhattan distance between an output pin of the current cell and an output pin of the next stage of cell, the type of the current cell, the type of the next stage of cell, and the number of fan-outs of the output pin of the current cell.

S22: the features of the cells obtained in S21 are combined into path feature sequences according to a connection relation of the cells in the circuit path, and path timing feature sequences and path physical topological feature sequences are input to the convolutional neural network. Wherein, the path timing feature sequences comprise a sequence formed by the input transition time of all stages of cells in the path, a sequence formed by the output transition time of all the stages of cells, a sequence formed by the input signal polarity of all the stages of cells, a sequence formed by the output signal polarity of all the stages of cells, and a sequence formed by the delays of all the stages of cells. The path physical topological feature sequences comprise a sequence formed by the capacitance of the input pins of all the stages of cells in the path, a feature sequence formed by the capacitance of the output pin of each next stage of cell, a feature sequence formed by the current total output capacitance of all the stages of cells, a feature sequence formed by the horizontal and vertical coordinates of the input pins of all the stages of cells, a feature sequence formed by the Manhattan distance between the input pin of each stage of cell and the input pin of the next stage of cell, a sequence formed by the Manhattan distance between the output pin of each stage of cell and the output pin of the next stage of cell, a feature sequence formed by the type of all the stages of cells, a feature sequence formed by the type of each next stage of cell, and a feature sequence formed by the number of fan-outs of the output pin of all the stages of cells. A maximum length of a training path is set as max_len, and based on pad sequences of Kears, feature sequences with a length less than max_len are filled and feature sequences with a length greater than max_len are truncated.

S3: filter methods and wrapper methods are combined to form the integrated feature selection method, wherein the filter methods comprise a Pearson's correlation coefficient method and a variation coefficient method, the wrapper methods comprise a backward recursive feature elimination method based on a random forest model and a backward recursive feature elimination method based on a linear regression model, and based on the majority rule, an optimal feature sub-set is determined by voting according to results of the four feature selection methods. In this embodiment, the integrated feature selection process using the filter methods and the wrapper methods is completed based on a python environment and a machine learning library scikit-learn.

S31: during feature selection based on the filter methods, a distance correlation coefficient between each feature and the corresponding label obtained in S3 and a normalized variation coefficient of each cell feature are calculated through a distance correlation coefficient method and a variation coefficient method respectively. The distance correlation coefficient method evaluates the importance of features by calculating the distance correlation coefficient. A threshold of the distance correlation coefficient is set as $R_t$. Features with the distance correlation coefficient with the corresponding labels being greater than $R_t$ form a feature sub-set selected by the distance correlation coefficient method. The distance correlation coefficient is calculated as follows.

Based on the n×d feature matrix and the label vector Y obtained in S21, an intermediate variable $A_{kl}$ is calculated by formula (1), where the row vector of X is $X_1, X_2, \ldots$ and $X_n$, $X_k$ and $X_l$ represent the row vector formed by features of a $k^{th}$ cell and the row vector formed by features of a $l^{th}$ cell, $k=1, 2, \ldots, n$, $l=1, 2, \ldots, n$, n represents the number of all the cells, and d represents the number of all the features; $a_{kl}$ represents a Euclidean norm between $X_k$ and $X_l$; $\overline{a}_k$ represents a mean value of the sum of l calculated by $a_{kl}$; $\overline{a}_l$ represents a mean value of the sum of k calculated by $a_{kl}$; $\overline{a}*$ is a mean value of the sum of any one of l and k calculated by $a_{kl}$; $A_{kl}$ is the intermediate variable.

$$\begin{cases} a_{kl} = |X_k - X_l|_d \\ \overline{a}_k = \frac{1}{n}\sum_{l=1}^{n} a_{kl} \\ \overline{a}_l = \frac{1}{n}\sum_{k=1}^{n} a_{kl} \\ \overline{a}_* = \frac{1}{n^2}\sum_{k,l=1}^{n} a_{kl} \\ A_{kl} = a_{kl} - \overline{a}_k - \overline{a}_l + \overline{a}_* \end{cases} \quad (1)$$

Similarly, an intermediate variable $B_{kl}$ is calculated by formula (2), where $Y_k$ and $Y_l$ represent the labels of the $k^{th}$ cell and the $l^{th}$ cell, $k=1, 2, \ldots, n$, $l=1, 2, \ldots$ and n, n represents the number of all the cells, and d represents the number of all the features; $b_{kl}$ represents a Euclidean norm between $Y_k$ and $Y_l$; $\overline{b}_k$ represents a mean value of the sum of l calculated by $b_{kl}$; $\overline{b}_l$ represents a mean value of the sum of k calculated by $b_{kl}$; $\overline{b}*$ is a mean value of the sum of any one of l and k calculated by $b_{kl}$; $B_{kl}$ is the intermediate variable.

$$\begin{cases} b_{kl} = |Y_k - Y_l| \\ \overline{b}_k = \frac{1}{n}\sum_{l=1}^{n} b_{kl} \\ \overline{b}_l = \frac{1}{n}\sum_{k=1}^{n} b_{kl} \\ \overline{b}_* = \frac{1}{n^2}\sum_{k,l=1}^{n} b_{kl} \\ B_{kl} = b_{kl} - \overline{b}_k - \overline{b}_l + \overline{b}_* \end{cases} \quad (2)$$

A covariance of X and Y, a covariance $V_n^2(X)$ of X and itself and a covariance $V_n^2(Y)$ of Y and itself are calculated by formula (3).

$$\begin{cases} v_n^2(X, Y) = \frac{1}{n^2}\sum_{k,l=1}^{n} A_{kl}B_{kl} \\ v_n^2(X) = \frac{1}{n^2}\sum_{k,l=1}^{n} A_{kl}^2 \\ v_n^2(Y) = \frac{1}{n^2}\sum_{k,l=1}^{n} B_{kl}^2 \end{cases} \quad (3)$$

A distance correlation coefficient $R_n^2(X,Y)$ between the feature matrix X and the label vector Y is calculated by formula (4).

$$R_n^2(X, Y) = \begin{cases} \frac{v_n^2(X, Y)}{\sqrt{v_n^2(X)v_n^2(Y)}}, & v_n^2(X)v_n^2(Y) > 0 \\ 0 & v_n^2(X)v_n^2(Y) = 0 \end{cases} \quad (4)$$

The variation coefficient method evaluates the importance of features by calculating the normalized variation coefficient. The threshold of the normalized variation coefficient is set as $CV_t$, and features with the normalized variation coefficient exceeding $CV_t$ form a feature sub-set selected by the variation coefficient method. The normalized variation coefficient $CV_t$ of one feature is calculated by formula (5), wherein $X_i$ represents the column vector of an $i^{th}$ feature, $i=1, 2, \ldots, d$, d is the number of all features, std( ) represents a standard deviation, and mean( ) represents a mean value.

$$CV(X_i) = \frac{std(X_i)}{mean(X_i)} / \sum_{i=1}^{d} \frac{std(X_i)}{mean(X_i)} \qquad (5)$$

S32: the backward recursive feature elimination method based on the random forest model and the backward recursive feature elimination method based on the linear regression model are selected as the wrapper methods depending on model selection, and the number of features in a target feature sub-set is set as m(1≤m≤d).

S321: the feature matrix X of stage 1 obtained in S2 and the label vector Y formed by cell delays in stage 2 are used as input features and labels of the random forest model. In the backward recursive feature elimination process, from the feature universal set F, the trained random forest model figures out the importance of each feature in the model by calculating a Gini index score of said feature using a feature importance evaluation function integrated in the model. Then, the least important feature is deleted to obtain a new feature sub-set $F_{new}$.

S322: next, the model is retrained based on the new feature sub-set $F_{new}$ obtained in S321 and the importance of the features is obtained again to generate a new feature sub-set. This iteration process is repeated until the number of features in the new feature sub-set is m. At this moment, the feature sub-set formed by the m features is a target feature sub-set selected by the backward recursive feature elimination method based on the random forest model.

S331: the feature matrix X of stage 1 obtained in S2 and the label vector Y formed by cell delays in stage 2 are used as input features and labels of the linear regression model, wherein the linear regression model is shown by formula (6). f(X) is an output value of the linear regression model, $X'=(x_1, x_2, \ldots, x_d)$, X is the feature matrix, $x_l$ represents the column vector formed by the values of the $l^{th}$ feature of all the cells, $w_l$ represents a corresponding coefficient of a feature vector $x_l$ in the model, b is an offset, l=1, 2, ..., d, and d is the number of all features. In the backward recursive feature elimination process, from the feature universal set F, the trained model sorts the features according to the corresponding coefficients of the features in the linear regression model, and then the feature with a minimal coefficient (the least important feature $F_{min}'$) is deleted to obtain a new feature sub-set $F_{new}'$.

$$f(X) = w_1 x_1 + w_2 x_2 + \ldots + w_d x_d + b \qquad (6)$$

S332: next, the model is retrained based on the new feature sub-set $F_{new}$ obtained in S321 and the importance of the features is obtained again to generate a new feature sub-set. This iteration process is repeated until the number of features in the new feature sub-set is m. At this moment, the feature sub-set formed by the m features is a target feature sub-set selected by the backward recursive feature elimination method based on the linear regression model.

S34: the feature sub-sets selected by the distance correlation coefficient method, the variation coefficient method, the backward recursive feature elimination method based on the random forest model and the backward recursive feature elimination method based on the linear regression model are not completely the same. The four feature selection methods provide selection results of the $i^{th}$ feature $F_i$ respectively, i=1, 2, ... and d, and d is the number of all features. If $m_i$ feature selection methods select the feature $F_i$, $m_i$=0, 1, 2, 3 and 4, the voting result is $m_i$. Finally, based on the majority rule, all the features $F_i$ satisfying $m_i \geq m_0 (1 \leq m_0 \leq 4)$ form an optimal feature sub-set $F_{opt}$ selected by the integrated feature selection method, wherein the number of features in the optimal feature sub-set $F_{opt}$ is $M_{opt}$.

S4: a path delay prediction model is established in the python environment. A path feature sequence formed by features corresponding to the optimal feature sub-set determined in S3 is used as an input of the one-dimensional convolutional neural network, a path delay of stage 1 passes through a fully connected layer and is then merged with an output by the convolutional neural network, a predicted path delay residual of stage 1 and stage 2 is obtained after dimension reduction, and then the predicted path delay residual is added with the path delay of stage 1 to obtain a path delay of stage 2 estimated by the model.

S41: the optimal feature sub-set $F_{opt}$ selected by feature selection in S3 is input to the one-dimensional convolutional neural network.

S42: then, each feature is encoded by an input embedding layer. Each input feature sequence in the feature sequence obtained in S22 is transformed into a vector with a dimensional of $dim_j$ by a special trainable embedding layer, that is, the input feature sequence with a dimension of (p,max_len) is transformed into a tensor with a dimension of (p,max_len, $dim_j$), wherein samples is the number of paths in the circuit, max_len is a maximum path length, $dim_j$ is a designated word vector dimension of a $j^{th}$ feature in the embedding layer, j=1, 2, ..., $M_{opt}$, and $M_{opt}$ is the number of input features. $M_{opt}$ tensors are concatenated to obtain a tensor with a dimension of (p,max_len,dim), which is used as an input tensor T, where dim, as shown by formula (7), is the sum of dimensions of the $M_{opt}$ tensors.

$$dim = \sum_{j=1}^{M_{best}} dim_j \qquad (7)$$

S43: convolution calculation is performed on T with multiple convolution kernels of different sizes, and data dimension reduction is performed on convolution calculation results by an activation function and max-pooling respectively, dimension-reduced data is spliced with the path delay of stage 1 subjected to nonlinear transform, spliced data is transformed into one-dimensional data by multiple times of nonlinear transform, that is, a predicted path delay residual of stage 1 and stage 2 is obtained. Finally, the path delay of stage 1 is added with the predicted path delay residual of stage 1 and stage 2 to obtain a final predicted path delay of stage 2. In this embodiment, the one-dimensional convolutional neural network is established based on a pytorch framework, and some parameters of the network are set: the number of convolution kernels is two, three sizes of the convolution kernels are 3, 4 and 5 respectively, the convolution step is 1, and the activation function is linear rectification (Relu).

S5: a training set and a test set are established, the training set is used for model training, and the test set is used for verifying model accuracy and efficiency. Training and test circuits are reference circuits from ISCAS and OpenCores, wherein systemcaes, aes_core, ecg, s38417, vga_lcd and wb_commax are used as six known circuits, and ethenet, pci_bridge32 and tv80 are used as three unknown circuits. 80% of paths of the known circuits are selected randomly to form the training set, and 20% of the paths of the known circuits form the test set for predicting the prediction performance of a model on the known circuits. All paths of the unknown circuits are used as a test set to verify the prediction performance of a model on the unknown circuits. Moreover, the running time of the path delay prediction method for an integrated circuit based on feature selection and deep learning is shortened, as compared with traditional processes, thus greatly saving the time.

What is claimed is:

1. A path delay prediction method for an integrated circuit based on feature selection and deep learning, comprising:
   S1: performing physical implementation on a synthesized circuit netlist, which comprises a floor-planning stage, a placement stage, a clock tree synthesis stage and a routing stage according to an implementation process;
   S2: respectively performing static timing analysis on the synthesized circuit netlist in a stage 1 and a stage 2 after stage 1 of the performed physical implementation, extracting timing and physical topological information of each cell in each path in stage 1 and using the extracted timing and physical topological information as features to form a feature universal set F, extracting cell delays and circuit path delays in stage 2 and using the extracted cell delays and circuit path delays as labels of feature selection and a convolutional neural network respectively, training the convolutional neural network, and predicting a circuit path delay of stage 2;
   S3: combining filter methods and wrapper methods to form an integrated feature selection method, and inputting the feature universal set F and the labels of feature selection to the integrated feature selection method to determine an optimal feature sub-set;
   S4: using a path feature sequence formed by features corresponding to the optimal feature sub-set as an input of the convolutional neural network, merging a path delay of stage 1 passing through a fully connected layer and an output of the convolutional neural network, performing dimension reduction on merged data to obtain a predicted path delay residual of stage 1 and stage 2, and adding the predicted path delay residual and the path delay of stage 1 to obtain a path delay of stage 2 estimated by a model; and
   S5: randomly classifying all data into a training set and a test set, calculating, by the integrated feature selection method, the importance of features using data in the training set, and obtaining an optimal feature sub-set; and training the model using the data in the training set, and verifying the accuracy and efficiency of the trained model using data in the test set.

2. The path delay prediction method for an integrated circuit based on feature selection and deep learning according to claim 1, wherein timing features of a cell comprise an input transition time, an output transition time, an input signal polarity, an output signal polarity and a delay of the cell; and
   physical topological features of a cell comprise a capacitance of an input pin of a current cell, a capacitance of an input pin of a next stage of cell, a total output capacitance of the current cell, horizontal and vertical coordinates of the input pin of the current cell, a Manhattan distance between the input pin of the current cell and the input pin of the next stage of cell, a Manhattan distance between an output pin of the current cell and an output pin of the next stage of cell, a type of the current cell, a type of the next stage of cell, and the number of fan-outs of the output pin of the current cell.

3. The path delay prediction method for an integrated circuit based on feature selection and deep learning according to claim 1, wherein in S2, the features of the cells, which are the feature universal set F, are combined into a path feature sequence according to a connection relation of the cells in a circuit path, and inputting path timing and physical topological feature sequences to the convolutional neural network.

4. The path delay prediction method for an integrated circuit based on feature selection and deep learning according to claim 1, wherein the filter methods comprise a distance correlation coefficient method and a variation coefficient method, and the wrapper methods comprise a backward recursive feature elimination method based on a random forest model and a backward recursive feature elimination method based on a linear regression model.

5. The path delay prediction method for an integrated circuit based on feature selection and deep learning according to claim 4, wherein the distance correlation coefficient method evaluates the importance of the features by calculating a distance correlation coefficient, and the variation coefficient method evaluates the importance of the features by calculating a normalized variation coefficient.

6. The path delay prediction method for an integrated circuit based on feature selection and deep learning according to claim 4, wherein steps for evaluating the importance of the features by the wrapper methods comprise:
   S32: setting the number of features in a target feature sub-set as m, wherein ($1 \leq m \leq d$), and d is the number of all the features;
   S321: using a feature matrix X of stage 1 obtained in S2 and a label vector Y formed by the cell delay labels in stage 2 to train the random forest model, and then calculating a Gini index score of each feature to obtain the importance of each feature in the random forest model; and selecting a least important feature, and deleting the least important feature from the feature matrix X of to obtain an updated feature matrix X with a dimension of $n \times (d-1)$, wherein n is a number of cells;
   S322: repeating S321 by backward recursive feature elimination to update the feature matrix X until the dimension of the feature matrix X is $n \times m$, and using a feature sub-set formed by remaining m features as a target feature sub-set selected by the backward recursive feature elimination method based on the random forest model;
   S331: using the feature matrix X of stage 1 obtained in S2 and the label vector Y formed by the cell delay labels in stage 2 to train the linear regression model, and then calculating an output value f(X) of the linear regression model by formula (1), wherein $x_i$ represents an $i^{th}$ feature column vector of the feature matrix X and corresponds to an $i^{th}$ feature of the n cells, $1 \leq i \leq d$, $w_i$ represents a corresponding coefficient of the $i^{th}$ feature column vector in the linear regression model, and b is an offset; selecting the feature with a minimum $w_i$, and deleting the feature with the minimum $w_i$ from the feature matrix X to obtain an updated feature matrix X; and $$f(X) = \sum_{i=1}^{d} w_i x_i + b \qquad (1)$$

S332: repeating S331 by backward recursive feature elimination to update the feature matrix X until the dimension of the feature matrix X is $n \times m$, and using a feature sub-set formed by remaining m features as a target feature sub-set selected by the backward recursive feature elimination method based on the linear regression model.

7. The path delay prediction method for an integrated circuit based on feature selection and deep learning according to claim 4, wherein steps for determining the optimal feature sub-set by the integrated feature selection method comprise:

forming a feature sub-set by feature vectors exceeding a threshold $R_t$ selected by the distance correlation coefficient method, forming a feature sub-set by feature vectors exceeding a threshold $CV_t$ selected by the variation coefficient method, forming a feature sub-set by m features selected by the backward recursive feature elimination method based on the random forest model, and forming a feature sub-set by m features selected by the backward recursive feature elimination method based on the linear regression model, wherein the feature sub-sets are not completely the same; providing selection results $1 \leq i \leq d$ of an $i^{th}$ feature $F_i$ by the four feature selection methods respectively, wherein d is the number of all the features; and based on a majority rule, forming the optimal feature sub-set selected by the integrated feature selection method by all the features $F_i$ satisfying $m_i \geq m_0$ ($1 \leq m_0 \leq 4$), wherein the number of features in the optimal feature sub-set is $M_{opt}$ and $m_i$ is a number of feature selection methods that select the feature $F_i$.

8. The path delay prediction method for an integrated circuit based on feature selection and deep learning according to claim 7, wherein the convolutional neural network is established, and S4 specifically comprises:

S41: according to the optimal feature sub-set of S3, selecting corresponding columns in a feature matrix X of stage 1 obtained in S2 to form a matrix $X_{opt}$ with a dimension of $n \times M_{opt}$, wherein n is a number of cells, and using the matrix $X_{opt}$ as an input feature matrix of the convolutional neural network;

S42: encoding each feature by an input embedding layer; transforming each input feature sequence in an input sequence obtained in S22 into a vector with a dimensional of $dim_j$ by a special trainable embedding layer, which is transforming the input feature sequence with a dimension of (p,max_len) into a tensor with a dimension of (p,max_len,$dim_j$), wherein p is the number of paths in the circuit, max_len is a maximum path length, $dim_j$ is a designated word vector dimension of a $j^{th}$ feature in the embedding layer, and $1 \leq j \leq M_{opt}$; concatenating $M_{opt}$ tensors to obtain a tensor with a dimension of (p,max_len,dim), which is used as an input tensor T, where dim, as shown by formula (2), is the sum of dimensions of the $M_{opt}$ tensors; and $$dim = \sum_{j=1}^{m_{opt}} dim_j \qquad (2)$$

S43: performing convolution calculation on the input tensor T obtained in S42 with multiple convolution kernels of different sizes, and performing data dimension reduction on convolution calculation results by an activation function and max-pooling respectively, splicing dimension-reduced data and the path delay of stage 1 subjected to nonlinear transform, and transforming spliced data into one-dimensional data by multiple times of nonlinear transform, such that the predicted path delay residual of stage 1 and stage 2 is obtained; finally, adding the path delay of stage 1 and the predicted path delay residual of stage 1 and stage 2 to obtain a predicted path delay of stage 2.

* * * * *